UNITED STATES PATENT OFFICE.

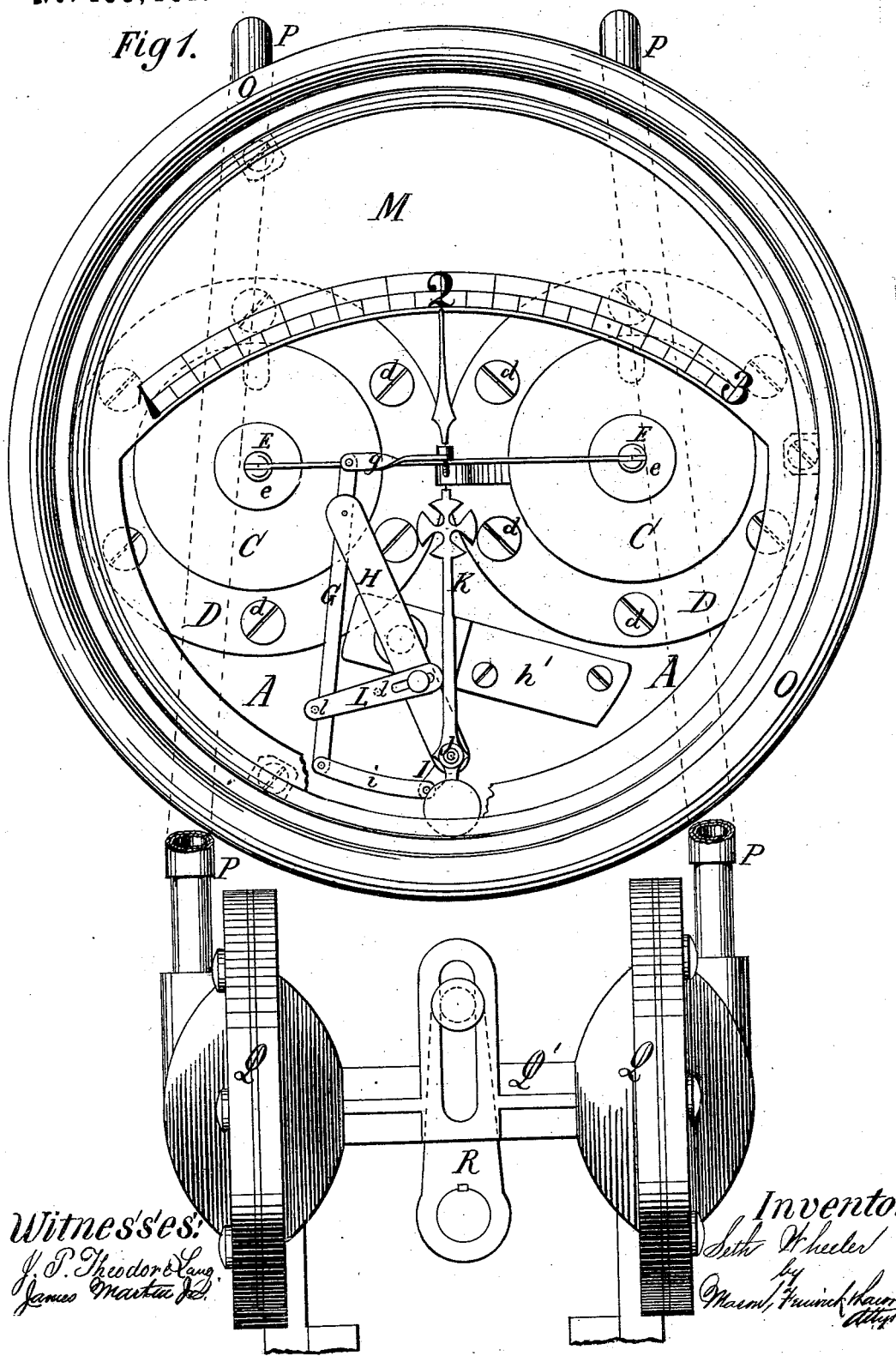

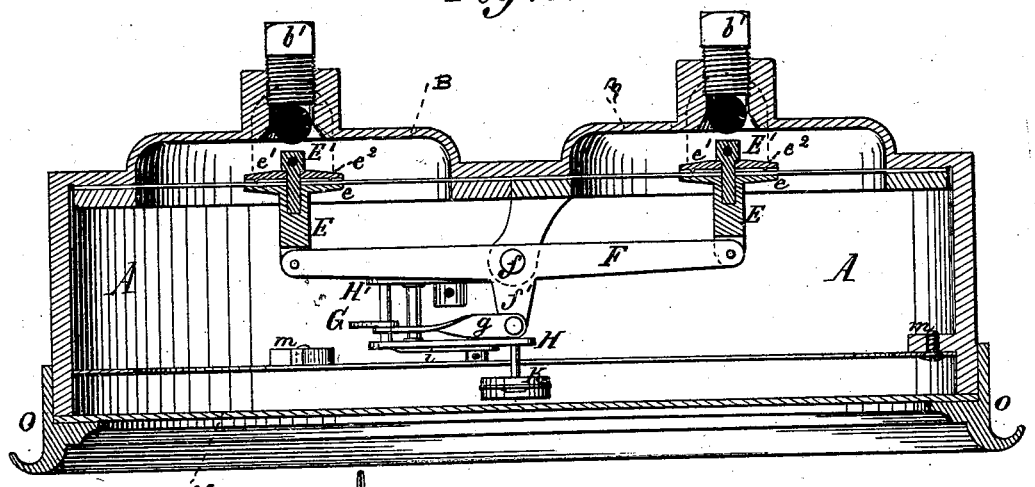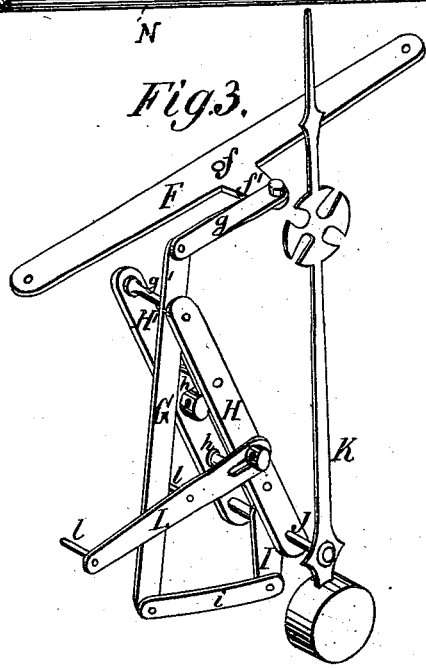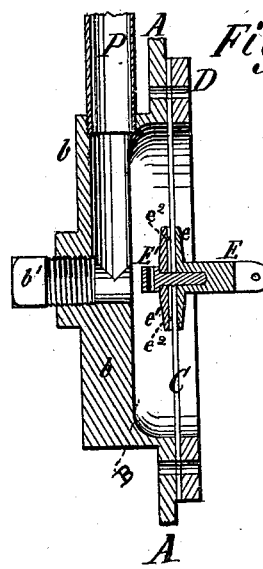

SETH WHEELER, OF ALBANY, NEW YORK.

IMPROVEMENT IN INDICATORS.

Specification forming part of Letters Patent No. 188,451, dated March 13, 1877; application filed July 21, 1876.

*To all whom it may concern:*

Be it known that I, SETH WHEELER, of Albany, in the county of Albany and State of New York, have invented a new and useful Improvement in Indicators; and I do hereby declare that the following is a full, clear, and exact description of the same, reference being had to the accompanying drawings, making part of this specification, in which—

Figure 1 is a front view of my improved indicator. Fig. 2 is a transverse section of the same. Fig. 3 is a detailed perspective view of the finger-motion, and Fig. 4 is a vertical section of one of the diaphragms by which the finger-motion is operated.

The nature of my invention consists in certain constructions, combinations, and arrangements of parts, hereinafter described and specifically claimed, whereby a very reliable and quick-acting indicator for low or high water in boilers, reservoirs, cisterns, ships' holds, and similar vessels is produced.

The object of my invention is to make a very sensitive indicator of the above description, which operates with reliability even at a great distance from its source of operation.

To enable others skilled in the art to understand my invention, I will proceed to describe it.

In the accompanying drawings, A represents a cylindrical case, the bottom of which is provided with two depressions, B. The said depressions B are closed by flat elastic fabrics or skins C, which are air-tight, attached firmly or held securely to the bottom of the vessel A by two rings, D, and set-screws $d$. At the center of the elastic cover C a stand, E, is fastened by means of a collar, $e$, and a washer, $e^1$, which are clamped together by a screw, E'. The collar $e$ or the washer $e^1$ is provided at the face with an annular ridge, $e^2$, whereby leakage between the collar and washer is prevented. The two stands E are coupled by a lever, F, fulcrumed at $f$, and provided with a rectangular arm, $f'$. The arm $f'$ is connected with a lever, G, by means of a link, $g$. The fulcrum of the lever G consists of a shaft, $g'$, which is placed in a frame composed of two parallel bars, H H', and several connecting cross-bars, $h$. The bar H' is fastened to a bracket, $h'$, attached to the bottom of the case A. The lever G is connected at its lower end by means of a link, $i$, with a lever-arm, I, on a shaft, J, to which the pointer or finger K is attached. The shaft J is held between the bars H H'. The bar H has an arm, L, with two banking-pins, $l$, between which the lever F is plying, and whereby its oscillations are limited, so as not to move the pointer K beyond the extreme marks of the dial. The dial M is fastened to small projections $m$ on the case A, and is situated between the balanced pointer K and its operating parts. Said dial is provided with a graduated scale, representing the different heights of water. The case A is covered with a glass, N, held in place by a rim, O, fitted upon the case. The depressions B communicate, by means of pipes or air-tight hose P, with two coupled diaphragms, Q, which are operated by coupling-rods Q' and a crank, R, or by other similar means connected with a float. The construction and operation of the said diaphragms Q being precisely the same as those for which a patent was allowed to me on the 9th day of May, 1876, I do not therefore deem a description of their details necessary. The depressions B are furnished at their backs with projections $b$, which are bored and tapped for the insertion of a pipe either from above or below, and thereby afford a convenient means for connection with the coupled diaphragms Q. In case the indicator is to be close against a wall, the central plugs $b'$ are removed and the connecting-pipes P inserted in their place, the said pipes P being conducted through the wall.

In many instances but a single line of pipe and one set of diaphragms need be used—for instance, if the distance between the float and indicator is short or the pipe is run where it will not be subject to much change of temperature.

Operation: When the float, which moves the coupling-rod Q', is moved up or down by the changes of the water-level upon which it is borne, it moves the diaphragms Q to the right or left. In the first case the air-column between the right diaphragm and the right depression B is propelled toward the case A, thereby pushing the cover C and the right stand E out, and throwing the lever F out of its normal position. The air-column between the left diaphragm Q and depression B is drawn backward, thereby acting as suction upon the left cover C, and moving the left stand E back, and thus assisting the movement of the left end of the lever F. The said motion of the lever F is transmitted by the arm $f'$ and the link $g$ to the lever G, which, by means of the link $i$, moves the pointer K to the left, indicating low water. In case of high water the described operation is reversed.

Having thus described my invention, what I claim, and desire to secure by Letters Patent, is—

1. A water-indicator having a diaphragm or piston which is connected to a pointer, and is operated by the action of a moving column of air, substantially as described.

2. A water-indicator having two elastic diaphragms or pistons which are connected with a pointer, and operated by the simultaneous action of two separated and oppositely-moving air-columns, substantially as described.

3. In an indicator operated by movable air-columns, the diaphragms C, the lever F, the lever G, the lever-arm I, and the pointer K, constructed and operating substantially as set forth.

4. An indicator having two sets of coupled diaphragms, one set imparting motion to the other through compression and expansion of the air confined between them, substantially as and for the purpose set forth.

Witness my hand in the matter of my application for a patent for an indicator this 19th day of July, 1876.

SETH WHEELER.

Witnesses:
GEORGE C. LEE,
E. WACKERHAGEN.